US006187283B1

(12) United States Patent
Chiyoda et al.

(10) Patent No.: US 6,187,283 B1
(45) Date of Patent: Feb. 13, 2001

(54) HYDROTHERMAL CONVERSION OF Y-ZEOLITE USING ALKALINE EARTH CATIONS

(75) Inventors: Osamu Chiyoda; Mark E. Davis, both of Pasadena, CA (US)

(73) Assignee: California Institute of Technology, Pasadena, CA (US)

(*) Notice: Under 35 U.S.C. 154(b), the term of this patent shall be extended for 0 days.

(21) Appl. No.: 09/357,199

(22) Filed: Jul. 20, 1999

Related U.S. Application Data

(63) Continuation-in-part of application No. 08/836,966, filed on Jul. 29, 1997, now Pat. No. 5,935,551.
(60) Provisional application No. 60/006,778, filed on Nov. 15, 1995.

(51) Int. Cl.$^7$ .............................. C01B 39/02; C01B 39/28
(52) U.S. Cl. .................. 423/700; 423/712; 423/716; 423/709; 423/DIG. 21
(58) Field of Search ................... 423/700, 712, 423/716, 709, DIG. 21

(56) References Cited

U.S. PATENT DOCUMENTS

| | | |
|---|---|---|
| 3,008,803 | 11/1961 | Milton . |
| 3,733,390 | 5/1973 | Robson . |
| 4,401,633 | 8/1983 | Sun . |
| 4,496,528 | 1/1985 | Bourgogne et al. . |
| 4,503,024 | 3/1985 | Bourgogne et al. . |
| 4,980,323 | 12/1990 | Bedard et al. ..................... 501/119 |
| 5,139,760 | 8/1992 | Ogawa et al. . |
| 5,225,179 | 7/1993 | Zones et al. ......................... 423/709 |
| 5,340,563 | 8/1994 | Zones et al. ......................... 423/706 |
| 5,374,370 | 12/1994 | Brown et al. .................... 252/174.25 |
| 5,599,520 | 2/1997 | Garces et al. ....................... 423/700 |
| 5,653,956 | * 8/1997 | Zones ................................. 423/706 |
| 5,939,044 | * 8/1999 | Nakagawa et al. ................. 423/706 |

FOREIGN PATENT DOCUMENTS

| | | |
|---|---|---|
| 775049 | 11/1980 | (SU) . |
| 1049425 | 10/1983 | (SU) . |
| 1230995 | 5/1986 | (SU) . |
| 1353729 | 11/1987 | (SU) . |
| 94/26662 | 11/1994 | (WO) . |

OTHER PUBLICATIONS

Barrer et al., Hydrothermal Chemistry of Silicates, Part XII, Synthetic Barium Aluminosilicates, J. Chem. Soc., 1964, pp. 2296–2305 (No Month).

Barrer, "Some Researches in Silicates: Mineral Synthesis and Metamorphoses," Trans. Brit. Ceramic Soc., vol. 56, pp. 155–84 (1957) (No Month).

Hakansson et al., "Structure of High–Silica Variety of Zeolite Na–P," Acta Cryst., C46, pp. 1363–1364 (1990) (No Month).

Grejtak et al., "Unit Cell Formulas and Framework/Extra–Framework Aluminium Ratio in Natural and Dealuminated Clinoptiloite," Geo. Carpathica—Series Clays, 45, 2, Bratislava, pp. 99–102, (Dec. 1994).

(List continued on next page.)

Primary Examiner—Mark L. Bell
Assistant Examiner—David Sample
(74) Attorney, Agent, or Firm—Limbach & Limbach LLP

(57) ABSTRACT

Hydrothermal synthesis of the natural, alkaline earth zeolites via the alteration of Y-zeolite is presented. Synthetic versions of the zeolites harmotome, heulandite, brewsterite and gmelinite are synthesized from Y-zeolite using alkaline earth cations containing solutions. The effect of the composition of the starting zeolite, the composition of the solution phase, the presence or absence of seeds and the experimental conditions are discussed.

31 Claims, 6 Drawing Sheets

OTHER PUBLICATIONS

Valueva, "Dehydration Behavior of Heulandite–group Zeolites as a Function of Their Chemical Composition," Eur. J. Mineral, 1995, 7, 1411–1420 (No Month).

Zones et al., "Use of Modified Zeolites as Reagents Influencing Nucleation in Zeolites Synthesis", Zeolites: A Refined Tool for Designing Catalytic Sites, 1995 Elsevier Science B.V., pp. 45–52 (No Month).

Khodabandeh et al., "Alteration of Perlite to Calcium Zeolites", Microporous Materials, 9 (1997), pp. 161–172 (No Month).

Khodabandeh et al., "Synthesis of CIT–3: A Calcium Aluminosilicated with the Heulandite Topology", Microporous Materials 9, (1997), pp. 149–160 (No Month).

Khodabandeh et al., "Zeolites P1 and L as Precursors for the Preparation of Alkaline–Earth Zeolites", Microporous Materials 12 (1997), pp. 347–359 (No Month).

Tsuji et al., "Further Investigations on the Synthesis of Pure–Silica Molecular Sieves Via the Use of Organic Structure–Directing Agents", Microporous Materials 11 (1997), pp. 53–64 (No Month).

* cited by examiner

HYDROTHERMAL CONVERSION OF Y-ZEOLITE USING ALKALINE EARTH CATIONS

CROSS REFERENCE TO RELATED APPLICATIONS

This application is a continuation-in-part of U.S. application Ser. No. 08/836,966, filed Jul. 29, 1997 and entitled SYNTHESIS OF ZEOLITES BY HYDROTHERMAL REACTION OF ZEOLITE P1, now U.S. Pat. No. 5,935,551, which is a nonprovisional application claiming priority to provisional application U.S. Application Ser. No. 60/006,778 filed Nov. 15, 1995, both of which are incorporated herein by reference.

BACKGROUND OF THE INVENTION

1. Field of the Invention

The present invention relates to methods for synthesizing zeolites from Y-zeolite. More particularly, the present invention relates to methods for synthesizing synthetic analogues of heulandite, brewsterite, epistilbite, harmotome and gmelinite zeolites containing alkaline earth cations using Y-zeolite as a starting material

2. Description of the Related Art

Ever since Barrer's pioneering work (Barrer, et al., *J. Chem. Soc.*, (1961), 971), numerous studies in zeolite synthesis have concentrated on the use of organic structure-directing agents (SDAs) in the synthesis mixture that affect the crystallization of zeolite. Debate continues on the roles of various types of organic components in the crystallization process.

One problem with using organic reagents in zeolite synthesis is their cost. In order to reduce the expense of zeolite production, syntheses that do not use SDAs are desirable. Many natural zeolites that have unique structures have not been synthesized. Thus, new routes to synthesize known active zeolites without organic reagents could provide low cost materials Syntheses of the heulandite (HEU) family of zeolites, the most abundant zeolites found in nature, through a number of routes have been reported by Satokawa, et al. *Microporous Mater.*, 8 (1997), 49; Williams, *Chem. Commun.*, (1997), 2113; Zhao, et al., *Zeolites*, 19 (1997), 366–369; and Zhao, et al., *Microporous Mater.*, 21 (1998), 371–379. These syntheses involve conventional hydrothermal crystallization using alkaline metal cations and amorphous oxides (not zeolites).

Most natural zeolites have alkaline earth cations as the dominant cation (i.e., highest concentration relative to all other metal cations present) in their composition. Because of this fact, we studied use of alkaline earth cations to prepare HEU, harmotome (PHI), brewsterite (BRE), epistilbite (EPI) and Yugawaralite (YUG) type zeolites from either zeolite P or L, as reported in Khodabandeh, et al., *Microporous Mater.* 12:(4–6) 347–359 (December 1997) Khodabandeh, et al., *Microporous Mater.*, 11:(1–2) 87–95 (August 1997), Khodabandeh, et al., *Microporous Mater.*, 9: (3–4) 149–160 (September 1997), Khodabandeh, et al., *Chem. Comm.*, (10) 1205–1206 (May 1996). Of importance to our synthetic methodology is the starting material, e.g., the ratio of Si/Al and framework density. Hydrothermal conversions without organic SDAs can be effected only by converting a zeolite with a relatively lower framework density to one of a relatively higher framework density. Table 1 lists framework density for several zeolites.

TABLE 1

Exemplary Framework Densities

| Zeolite | Framework Density |
| --- | --- |
| FAU (Y-zeolite) | 12.7 |
| GME | 14.6 |
| *BEA (zeolite beta) | 15.0 |
| GIS (P-zeolite) | 15.4 |
| BOG | 15.6 |
| PHI | 15.8 |
| LTL (L-Zeolite) | 16.4 |
| HEU | 17.0 |
| BRE | 17.5 |
| EPI | 18.0 |
| YUG | 18.3 |

The choice of the starting material for zeolite synthesis with alkaline earth cations is of critical importance.

In 1960, Koizumi and Roy reported synthesis of a heulandite-type zeolite from the composition $CaO.Al_2O_3.7SiO_2.5H_2O$ at temperatures between 250° C. and 360° C. and a pressure range of 15,000 to 37,000 psi. In 1981, Wirsching obtained heulandite by hydrothermal alteration of rhyolitic glass under the action of $CaCl_2$ solutions at temperatures of 200° C. to 250° C. and reaction times of around 80 days. Additionally, some syntheses for clinoptilolite zeolites have been reported.

Without methods described herein or others developed by one of the inventors, it is either difficult or impossible to produce other zeolites synthetically. For example, gmelinite cannot be synthesized from zeolite P or L because the framework density gmelinite is relatively lower than that of either zeolite P or L.

Harmotome, another rare zeolite of hydrothermal origin which has the phillipsite (PHI) topology, is characterized by three dimensional channels consisting of pores composed of eight tetrahedral atoms. The dominant cation in the zeolite is Ba.

Epistilbite, another rare zeolite of hydrothermal origin, has previously been produced by hydrothermal treatment of rhyolytic glass at 250° C. and from powdered $SiO_2$ glass at 250° C. It has a structure characterized by intersecting channels composed of eight and ten tetrahedral atoms.

Zeolite beta (*BEA) (occurs naturally as mineral Tschernichite) and Boggsite (BOG) each can be synthesized from Y zeolite according to the methods of the present invention. Tschernichite has a Si/Al of about 5, but this ratio has not been synthesized Boggsite has Si/Al of about 5, but as far as the inventors are aware, has not yet been synthesized.

Since the naturally occurring materials are rare, but so potentially useful, it would be advantageous to enable less rigorous and therefore less expensive routes for producing greater quantities of these materials. Particularly of interest are routes that can produce materials with few or no impurities, i.e., anything other than the desired zeolite product (e.g., other zeolite by-product).

Y-zeolite (FAU) has long been used as an industrial catalyst due to its high activity and low cost. Furthermore, Y-zeolite can be used as an aluminum source for ZSM-5 synthesis (e.g., as reported by Bourgogne, et al., U.S. Pat. No. 4,503,024) and to prepare novel materials such as zeolite beta with low Si/Al ratios (Zones, et al., U.S. Pat. No. 5,340,563). When Y-zeolice can be used as an aluminum source in zeolite synthesis, the type of cations for ion exchange is very important. For example, although relative to the control (Na—Y), Co—Y or Cu—Y reaction rates to chabazite were just as fast, Fe and Cr inhibit this reaction completely, as reported by Zones, *J. Chem. Soc. Farad. Trans.,* 86 (1990), 3467 and 87 (1991), 3709 and *Stud. Sur. Sci. Catal.* Vol. 97, pp. 45–52 (1995).

Here, we focus on the use of Y-zeolite as a starting material for hydrothermal conversion with alkaline earth cations. Exemplary conversions of Y-zeolite to analcime (ANA) and synthetic analogues of heulandite, gmelinite (GME), harmotome and brewsterite zeolites are presented. The factors that determine the products are shown to be the Si/Al ratio in the starting zeolite, the presence or absence of seeds, the composition of the reaction medium, and the reaction time.

As one of ordinary skill would recognize, syntheses of other zeolites from Y-zeolite of relatively higher Si/Al, i.e., greater than 3.5, can utilize a commercially prepared Y-zeolite or can be synthesized, as is taught in the literature.

SUMMARY OF THE INVENTION

The present invention provides synthetic routes to form zeolites using Y-zeolite as a starting material. In one aspect, methods according to the invention use an alkaline earth cation in a hydrothermal alteration of Y-zeolite. In another aspect, methods according to the invention use a second alkaline earth cation in a hydrothermal alteration of Y-zeolite.

The new routes significantly reduce the time necessary to produce the desired product, and in some cases, permit synthesis of materials for which none has yet been previously reported by others, as far as the inventors are aware.

BRIEF DESCRIPTION OF THE FIGURES

The present invention will be better understood by reference to the drawings in which.

DESCRIPTION OF THE PREFERRED EMBODIMENTS

Figure 1:
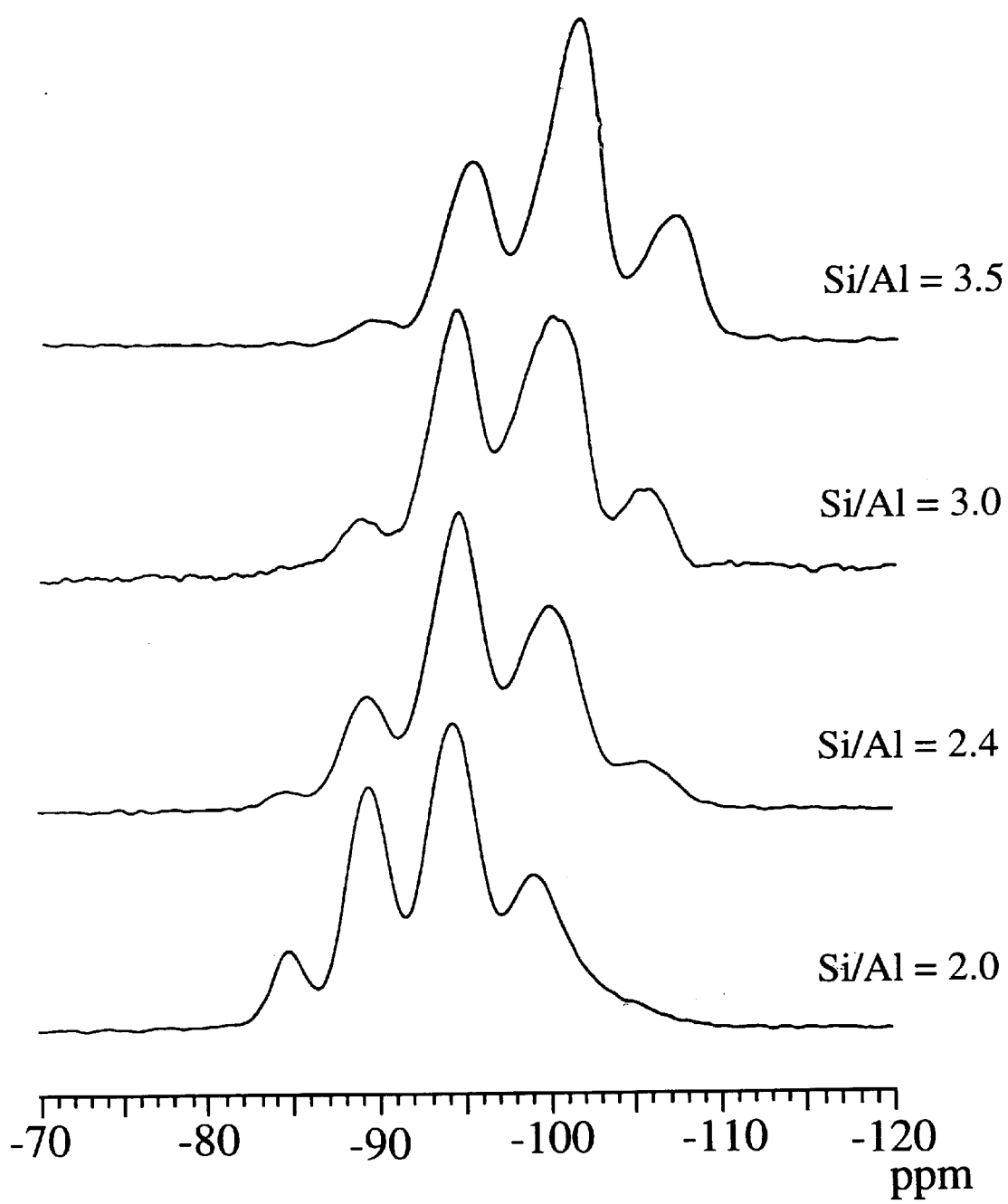
FIG. 1 shows $^{29}$Si NMR spectra of Y-zeolite as a function of framework Si/Al ratio.

The preferred embodiments of the invention are now described, in which a general method for the production of alkaline earth cation-containing zeolites from Y-zeolite is used.

The invention will be better understood by reference to the following definitions. Since naturally occurring zeolites have different names according to their structures and compositions, clarity is needed when referring to zeolites.

By "zeolites," we mean microporous crystalline aluminosilicates as are commonly known throughout the literature. We refer to zeolites by the names recognized as indicating their framework topologies and their chemical compositions. The relevant framework topologies are defined in the Atlas of Zeolite Structure Types, published by Butterworth-Heinemann for the structure commission of the International Zeolite Association (IZA), third edition (Meier and Olsen editors), which is incorporated herein by reference.

By the term "dominant" as used herein, we mean an alkaline earth cation having largest content relative to all other metal cations present. In the zeolite or reaction medium, the content of all other metal cations is preferably less than about 1%.

CIT-3 is a synthetic analogue of the natural calcium form of heulandite zeolite. This material typically crystallizes with a composition of $CaO:Al_2O_3:7SiO_2:6H_2O$ and has a two-dimensional pore system defined by intersecting 8- and 10-member ring pores.

CIT-4 is the first analogue of the rare natural zeolite brewsterite. It has a composition of $SrO:Al_2O_3:5.8SiO_2:4.5H_2O$ and possesses the brewsterite topology, which consists of intersecting 8-member ring pores in two dimensions.

Gmelinite is a natural sodium-calcium zeolite with a typical composition of $8Na_2O:4CaO:Al_2O_3:4SiO_2:6H_2O$. The main 12-member ring channels are interconnected at right angles by two-dimensional system of 8-member ring channels, and thus form a three-dimensional channel system.

Harmotome is the Ba-dominant analogue of the zeolite phillipsite (Gottardi, et al., *Natural Zeolites,* Springer-Verlag, Heidelberg (1985)). It has a typical composition of $BaO:Al_2O_3:6SiO_2:6H_2O$ and the phillipsite topology, which consists of 8-member ring channels in three crystallographic directions.

Analcime is a sodium containing zeolite, with a typical composition $Na_2O:Al_2O_3:4\ SiO_2:H_2O$ and has irregular channels formed by highly distorted 8-membered rings.

Zeolite Y is the sodium aluminosilicate analogue of the natural faujasite possessing three-dimensional 12-membered ring pores The Si/Al ratio of the Y-zeolite useful in the methods of the present invention is at least 2.0, preferably between 2.0 and 10.0, more preferably between 2.0 and 5.0 and most preferably between 2.0 and 3.5.

Exemplary Syntheses and Analyses:

EXAMPLE 1

Zeolite-Y Starting Materials

Exemplary zeolite Y starting materials prepared were Na—Y zeolites with Si/Al ratios from 2.0 to 3.5. For example, Na—Y zeolite with Si/Al=2.0 was prepared in a TEFLON jar by adding 12.0 g of colloidal $SiO_2$ (LUDOX HS-30) to a stirred solution containing 2.2 g of 50% w/w solution of NaOH and 1.7 g of sodium aluminate ($Na_2O:Al_2O_3:3H_2O$, EM) in 13.0 ml of water. This mixture was stirred at room temperature for 20–24 hours. The resulting gel was transferred to a TEFLON-lined stainless steel autoclave and heated at 120° C. for 12 hours under autogenous pressure. After cooling the mixture, the zeolite synthesized was filtered and dried For the synthesis of Na—Y zeolites with Si/Al up to 5, 15-crown-5 (i.e., 1,4,7,10,13-pentaoxacyclopentadecane) was added first to the stirred solution. For example, Y-zeolite with Si/Al of 3.5 was prepared as follows: 1.4 g of sodium aluminate were added to a solution containing 1.8 g of 15-crown-5 and 1.8 g of 50% w/w NaOH in 10.0 g water. 16.0 g of colloidal silica were then added and the mixture stirred at room temperature for 20–24 hours. The resulting reaction mixture was transferred to a TEFLON-lined autoclave reactor and statically heated at a temperature of 110° C. for 7 days.

For Si/Al greater than about 5, other synthetic routes are known or the Y-zeolite can be purchased commercially.

Ion exchange of zeolites was carried out (1 g zeolite/100 mL solution) using 1.0N chloride solutions of the desired cation at 70–80° C. overnight (performed twice). Other solutions of the desired cation may be used, for example, nitrate or acetate. Carbonate solutions do not work due to low solubility in water. Thus, the method of the invention is not limited to use of chloride solutions.

The hydrothermal reaction of Y-zeolite with chloride solutions of the desired alkaline earth metal cation(s) and seeds, if used, at a temperature of 240° C. (in TEFLON-lined autoclave) was accomplished over the course of 7 to 24 days. The pH of each solution was adjusted by adding a small amount of a concentrated hydroxide solution of the desired alkaline earth cation. Seeds, when used, were natural brewsterite from Strontian, Scotland and natural heulandite from near Poona, India. The synthesized products CIT-3 or CIT-4 were also used as seeds instead of natural brewsterite or heulandite.

X-ray powder diffraction patterns were recorded on a Scintag XDS 2000 diffractometer using Cu—Kα radiation. The diffracted beam was detected by a liquid nitrogen-cooled germanium solid-state detector. In the case of routine analysis and identification of phases., the samples were analyzed in the 2θ range 2–51 in steps of 0.03° under a scan speed of 5.0°/min. The XRD profile was deconvoluted using split-Pearson line shapes and the cell parameters were refined using the Scintag cell refinement program.

Thermogravimetric analyses (TGA) were carried out on a DuPont 951 thermogravimetric analyzer. The samples were heated in air and the temperature ramp was 10° C./min.

Solid-state NMR spectroscopy was performed on a Bruker AM 300 spectrometer equipped with solids accessories. Samples were packed into 7-mm $ZrO_2$ rotors and spun in air. $^{29}Si$ (59.63 Mhz) NMR spectra were obtained using magic-angle spinning (MAS) at spinning rates of 3–4 kHz, pulse widths of 4s (400 pulse), and recycle delay times of 30–60 seconds. Tetrakis (trimethylsilyl) silane (TMS) was used as the external reference material for $^{29}Si$ NMR chemical shift determination, and all chemical shifts are reported in ppm relative to TMS. No line broadening was applied to the NMR data, Spectral deconvolution and simulation was performed using both the Bruker Linesim and MacFID software packages.

Nitrogen adsorption isotherms were collected at −196° C. on an Omnisorp 100CX analyzer. Samples were pretreated at 250° C. for 5 hours under vacuum. The adsorption isotherms for vapor-phase compounds were measured at 25° C. using a McBain-Bakr balance. The adsorption amount of vapor phase compounds was measured at a pressure of $P/P_0=0.3$. Prior to the adsorption experiments, the samples were dehydrated at 250° C. under vacuum for 5 hours.

Elemental analysis (ICP-MS) was performed by Galbraith Laboratories (Knoxville, Tenn.).

XRD Patterns and NMR Spectra of Y-zeolites

The XRD patterns for all the Y-zeolites in this study revealed that the samples to be used as starting materials were pure, single phases.

The $^{29}Si$ NMR spectra for four Y-zeolite samples with Si/Al varying from 2.0 to 3.5 are shown in FIG. 1. The four NMR peaks in each spectrum observed correspond to the following environments in the direction of decreasing chemical shift: Si(3Al), Si(2Al), S(1Al) and Si(0Al.).

Figure 2:
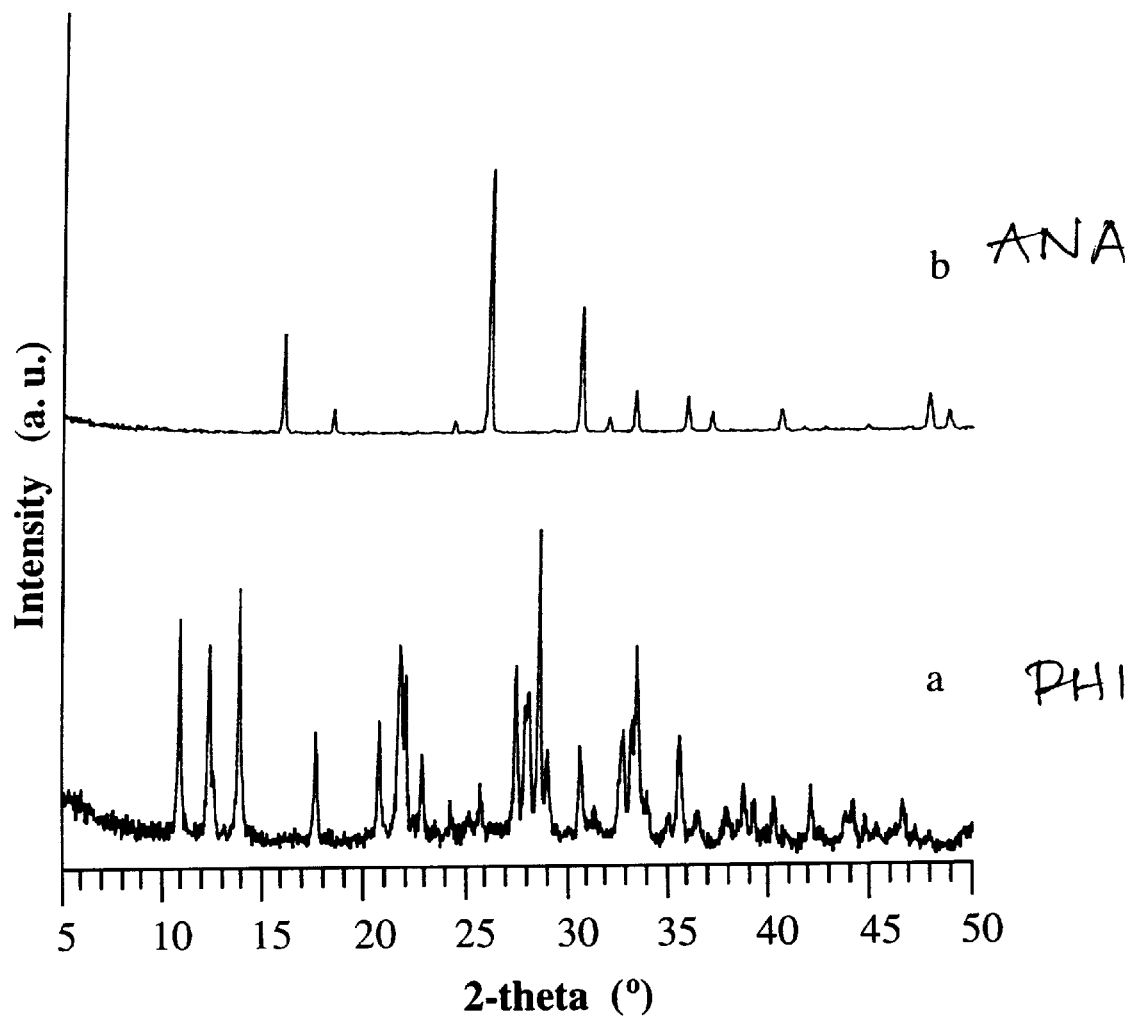
FIGS. 2*a* and 2*b* show XRD patterns for synthetic harmotome and synthetic analcime, respectively, prepared according to the present invention.

Assuming a random distribution of aluminum in the framework, it is possible to calculate the framework Si/Al ratio according to the equation:

$$Si/Al = \frac{\sum_{n=0}^{4} I_{Si(nAl)}}{\sum_{n=0}^{4} \frac{n}{4} I_{Si(nAl)}}$$

where the intensities of the peaks corresponding to Si(0Al) through Si(4Al) are determined by simulating the NMR spectrum. $^{29}Si$ NMR spectroscopy was used to determine the true framework Si/Al ratio of all Y-zeolites used in our experiments, and the values reported in FIG. 2 and in the text and tables are obtained via this method.

Conversions of Y-zeolite

Y-zeolites that have been synthesized with framework Si/Al ratios between 2.0 and 3.5 are used as the starting materials for methods according to the present invention. The conversion of these materials to other zeolites in solutions in which any of $Ba^{2+}$, $Ca^{2+}$, $Na^+$, and $Sr^{2+}$ is dominant is described below.

EXAMPLE 2

Y-zeollte in a barium-dominant reaction medium

In a barium-dominant aqueous reaction medium, harmotome (PHI) was the only product obtained at all conditions through the hydrothermal conversion from Y-zeolite (see Table 2). These reactions were performed using Y-zeolite with Si/Al ratio between 2.0 and 3.5, and a solution phase (reaction mixture) of $BaCl_2$ at a concentration of 0.1N and pH=11–12 (adjusted by the addition of $Ba(OH)_2$). The XRD pattern of the synthetic harmotome zeolite product obtained is shown in FIG. 2a. In the presence of seeds of heulandite or brewsterite, the product of the reaction is still harmotome. Seeding is usually at least about 1%; and typically 1–10%.

TABLE 2

Reactions to Y-zeolite with barium-containing solutions[a]

| Starting phase | Si/Al[b] | pH[c,d] | Seeds | Result |
|---|---|---|---|---|
| Sr-Y | 2.0 | 11 | — | PHI |
| Sr-Y | 2.4 | 11 | — | PHI |
| Sr-Y | 3.0 | 11 | — | PHI |
| Sr-Y | 3.0 | 11 | BRE (5%) | PHI |
| Sr-Y | 3.0 | 11 | HEU (5%) | PHI |
| Sr-Y | 3.5 | 11 | — | PHI |
| Ca-Y | 3.0 | 11 | — | PHI |

[a]0.02 g of Y-zeolite was reacted with 10 ml to solution phase at 240° C.
[b]Si/Al ratio was determined from $^{29}Si$ NMR data.
[c]Ph was adjusted by the addition of a few drops of $Ba(OH)_2$ solution.
[d][$Ba^{2+}$] = 0.1 N.

EXAMPLE 3

Y-zeolite in a calcium-dominant reaction medium

In a calcium-dominant aqueous reaction medium under conditions exemplified in Example 2, no hydrothermal conversion of Y-zeolites ion-exchanged by $Ba^{2+}$, $Ca^{2+}$, and $Sr^{2+}$ occurred even in the presence of 5% seeds of appropriate crystals (see Table 3). This result contrasts with the previous study for synthesis CIT-3 and CIT-4 from zeolite P1 where transformation takes place with calcium-containing solutions.

TABLE 3

Reactions of Y-zeolite with calcium-containing solutions[a]

| Starting phase | Si/Al[b] | pH[c,d] | Seeds | Result |
|---|---|---|---|---|
| Sr-Y | 2.0 | 11 | — | FAU |
| Sr-Y | 2.4 | 11 | — | FAU |
| Sr-Y | 3.0 | 12 | — | FAU |
| Sr-Y | 3.0 | 9 | — | FAU |
| Sr-Y | 3.0 | 11 | BRE (5%) | FAU |
| Sr-Y | 3.0 | 11 | HEU (5%) | FAU |
| Sr-Y | 3.5 | 11 | — | FAU |
| Ca-Y | 3.0 | 11 | — | FAU |
| Ca-Y | 3.0 | 11 | HEU (5%) | FAU |
| Sr-Y | 3.5 | 11 | — | FAU |
| Ba-Y | 3.0 | 12 | — | FAU |

[a]0.02 g of Y-zeolite was reacted with 10 ml of solution phase at 240° C.
[b]Si/Al ratio was determined from $^{29}$Si NMR data.
[c]pH was adjusted by the addition of a few drops of Ca(OH)$_2$ solution.
[d][Ca$^{2+}$] = 0.1 N.

EXAMPLE 4

Y-zeolite in a sodium-dominant reaction medium

In a sodium-dominant aqueous reaction medium, the product of conversion of NaY-zeolite that has Si/Al ratio from 2.0 to 3.0 was analcime (ANA) (see Table 4). The XRD pattern of this synthetic zeolite is shown in FIG. 2b. By comparison, conversion of Sr—Y in sodium-dominant aqueous reaction medium yielded analcime and gmelinite.

TABLE 4

Reactions of Y-zeolite with sodium-containing solutions[a]

| Starting phase | Si/Al[b] | pH[c,d] | Seeds | Result |
|---|---|---|---|---|
| Na-Y | 2.0 | 12 | — | ANA |
| Sr-Y | 2.0 | 11 | — | ANA + GME |
| Na-Y | 2.4 | 12 | — | ANA |
| Sr-Y | 2.4 | 11 | — | ANA + GME |
| Na-Y | 3.0 | 12 | — | ANA |

[a]0.02 g of Y-zeolite was reacted with 10 ml of solution phase at 240° C.
[b]Si/Al ratio was determined from $^{29}$Si NMR data.
[c]pH was adjusted by the addition of a few drops of NaOH solution.
[d][Na$^+$] = 0.1 N.

EXAMPLE 5

Y-zeolite in a strontium-dominant reaction medium

Figure 3:
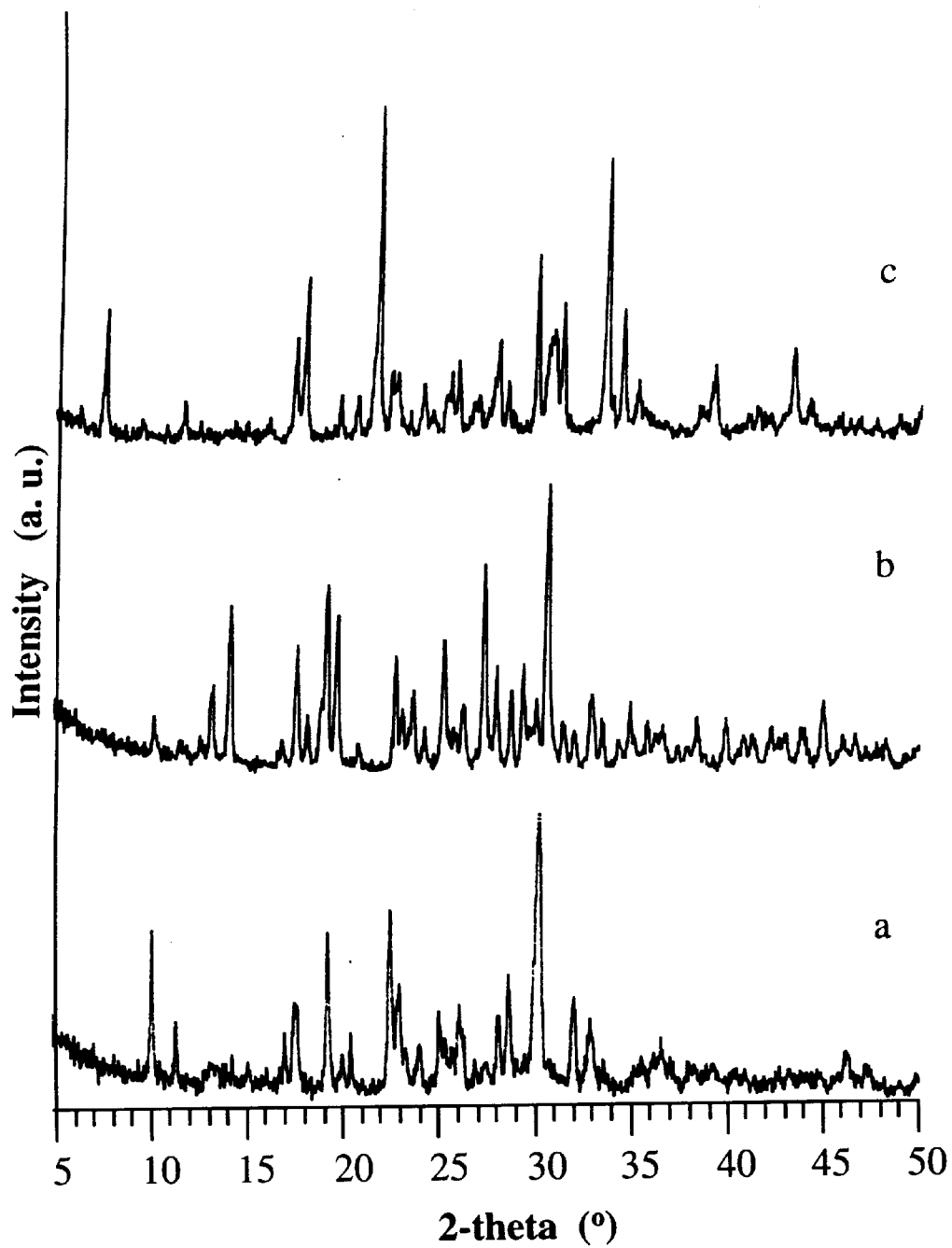
FIGS. 3*a*, 3*b* and 3*c* show XRD patterns for CIT-3, CIT-4 and synthetic gmelinite, respectively, prepared according to the present invention.

In a strontium-dominant aqueous reaction medium, three types of strontium-containing zeolites were obtained (see Table 5). Y-zeolite was converted to brewsterite (CIT-4), Sr-heulandite (CIT-3), and gmelinite. Sr—Y zeolite having a Si/Al ratio of 3.0 was transformed thoroughly into CIT-3 and CIT-4 in the presence of 5% seeds of the appropriate type. The XRD patterns of these synthetic zeolites are shown in FIG. 3.

TABLE 5

Reactions of Y zeolite with strontium-containing solutions[a]

| Starting phase | Si/Al[b] | pH[c,d] | Seeds | Result |
|---|---|---|---|---|
| Sr-Y | 2.0 | 11 | — | GME |
| Sr-Y | 2.0 | 11 | BRE (5%) | GME + CIT-4 |
| Sr-Y | 2.0 | 11 | HEU (5%) | GME + CIT-3 |
| Sr-Y | 2.4 | 11 | — | GME |
| Sr-Y | 2.4 | 11 | BRE (5%) | GME + CIT-4 |
| Sr-Y | 2.4 | 11 | HEU (5%) | GME + CIT-3 |
| Sr-Y | 3.0 | 11 | — | Amorphous |
| Sr-Y | 3.0 | 11 | BRE (5%) | CIT-4 |
| Sr-Y | 3.0 | 11 | HEU (5%) | CIT-3 |
| Sr-Y | 3.5 | 11 | — | Amorphous |
| Sr-Y | 3.5 | 11 | BRE (5%) | Amorphous |
| Sr-Y | 3.5 | 11 | HEU (5%) | Amorphous |
| Ca-Y | 3.0 | 11 | — | Ca-Y |
| Ca-Y | 3.0 | 11 | BRE (5%) | Ca-Y + CIT-4 |
| Ca-Y | 3.0 | 11 | HEU (5%) | Ca-Y + CIT-3 |

[a]0.02 g of Y-zeolite was reacted with 10 ml of solution phase at 240° C.
[b]Si/Al ratio was determined from $^{29}$Si NMR data.
[c]pH was adjusted by the addition of a few drops of Sr(OH)$_2$ solution.
[d][Sr$^{2+}$] = 0.1 N.

The conversion of Sr—Y zeolite to gmelinite occurred with Sr—Y zeolite having Si/Al under 2.4 and only in the absence of seeds. It appears that Sr—Y zeolite with low Si/Al ratio was converted to gmelinite because the Si/Al ratio of gmelinite is normally close to 2.0. On the other hand, only amorphous phases were obtained from Sr—Y zeolite with Si/Al ratios over 3.0 in the absence of seeds.

Figure 4:
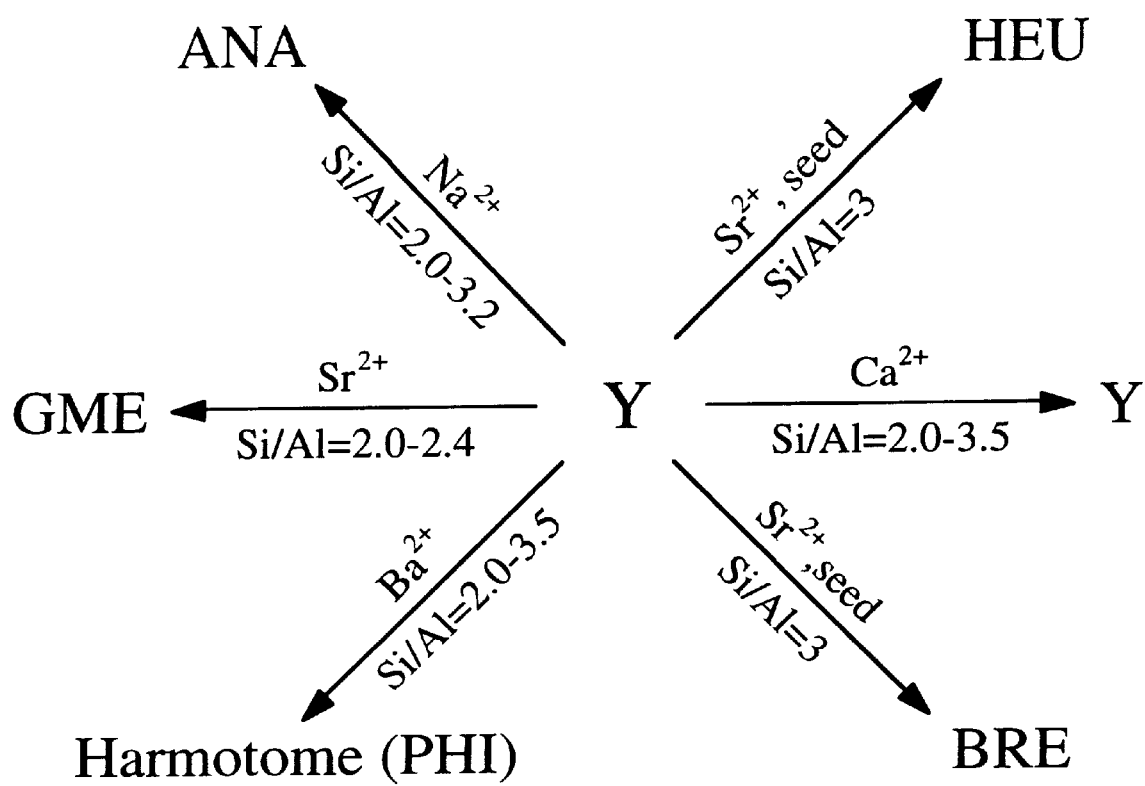
FIG. 4 graphically summarizes zeolite products achieved by treating Y-zeolite according to the present invention.

When Ca—Y zeolite was the starting material after hydrothermal conversion, XRD analysis revealed the XRD pattern of FAU in combination with CIT-3 or CIT-4. As shown in Table 5, Sr—Y zeolite having Si/Al ratio of 3.5 was not transformed into crystalline phase, even in the presence of seeds. The results presented above show that Y-zeolites having Si/Al in a certain range are particularly useful starting materials for the preparation of a number of alkaline earth zeolites using methods of the present invention. FIG. 4 summarizes results of these conversions of Y-zeolite to other zeolites.

EXAMPLE 6

Effect of experimental conditions on the synthesis of gmelinite

As shown by the data presented above, gmelinite was synthesized from Sr—Y zeolite with Si/Al ratio under 2.4 in a strontium-dominant reaction medium. Although research of gmellnite synthesis with strontium cation has been carried out for a long time, reproducibility of qmelinite synthesis was sometimes nil (Barrer, et al., 86 *Hydrothermal Chemistry of Silicates;* Part XII, (1964) 485–497). In order to determine the factors responsible for the lack of reproducibility of this synthesis, great care has been taken by the inventors to standardize factors such as temperature, heating time (duration in days), pH, solution concentration of strontium, and ratio of solution/starting zeolite. Table 6 summarizes the effects of these experimental factors on gmelinite synthesis.

TABLE 6

Reactions of Sr-Y with strontium-containing solutions[a]

| | | Solution | | | |
|---|---|---|---|---|---|
| [Sr$^{2+}$], N | pH[b] | Volume (ml) | Temperature (° C.) | Duration (Days) | Zeolite Product |
| 0.1 | 7 | 10 | 240 | 14 | GME + CHA |
| 0.1 | 10 | 10 | 240 | 14 | GME + CHA |
| 0.1 | 11 | 10 | 240 | 14 | GME |
| 0.1 | 12 | 10 | 240 | 14 | GME |
| 0.1 | 12.5 | 10 | 240 | 14 | GME + Layered |

TABLE 6-continued

Reactions of Sr-Y with strontium-containing solutions[a]

| Solution | | | | | |
|---|---|---|---|---|---|
| [$Sr^{2+}$], N | pH[b] | Volume (ml) | Temperature (° C.) | Duration (Days) | Zeolite Product |
| 0.1 | 13 | 10 | 240 | 14 | GME + Layered |
| 1.0 | 12 | 10 | 240 | 14 | GME + Layered |
| 0.1 | 12 | 5 | 240 | 14 | GME + Y-Zeolite |
| 0.1 | 12 | 15 | 240 | 14 | GME + Layered |
| 0.1 | 12 | 10 | 200 | 14 | GME + CHA |
| 0.1 | 10 | 15 | 240 | 14 | GME |
| 0.1 | 10 | 10 | 240 | 21 | GME |
| 0.1 | 12 | 20 | 240 | 14 | GME + Layered |

[a]0.02 g of Sr-Y zeolite with Si/Al = 2.0 was reacted with the solution.
[b]pH was adjusted by the addition of a few drops of Sr(OH)$_2$ solution.

Chabazite (CHA) was synthesized as an impurity with strontium-containing solutions of lower pH (<10) or at lower temperatures (<200° C.). However, if the hydrothermal conversion was carried out for long duration (>21 days) or with a large amount of the solution (>15 ml), chabazite was not synthesized even at low pH.

Figure 5:
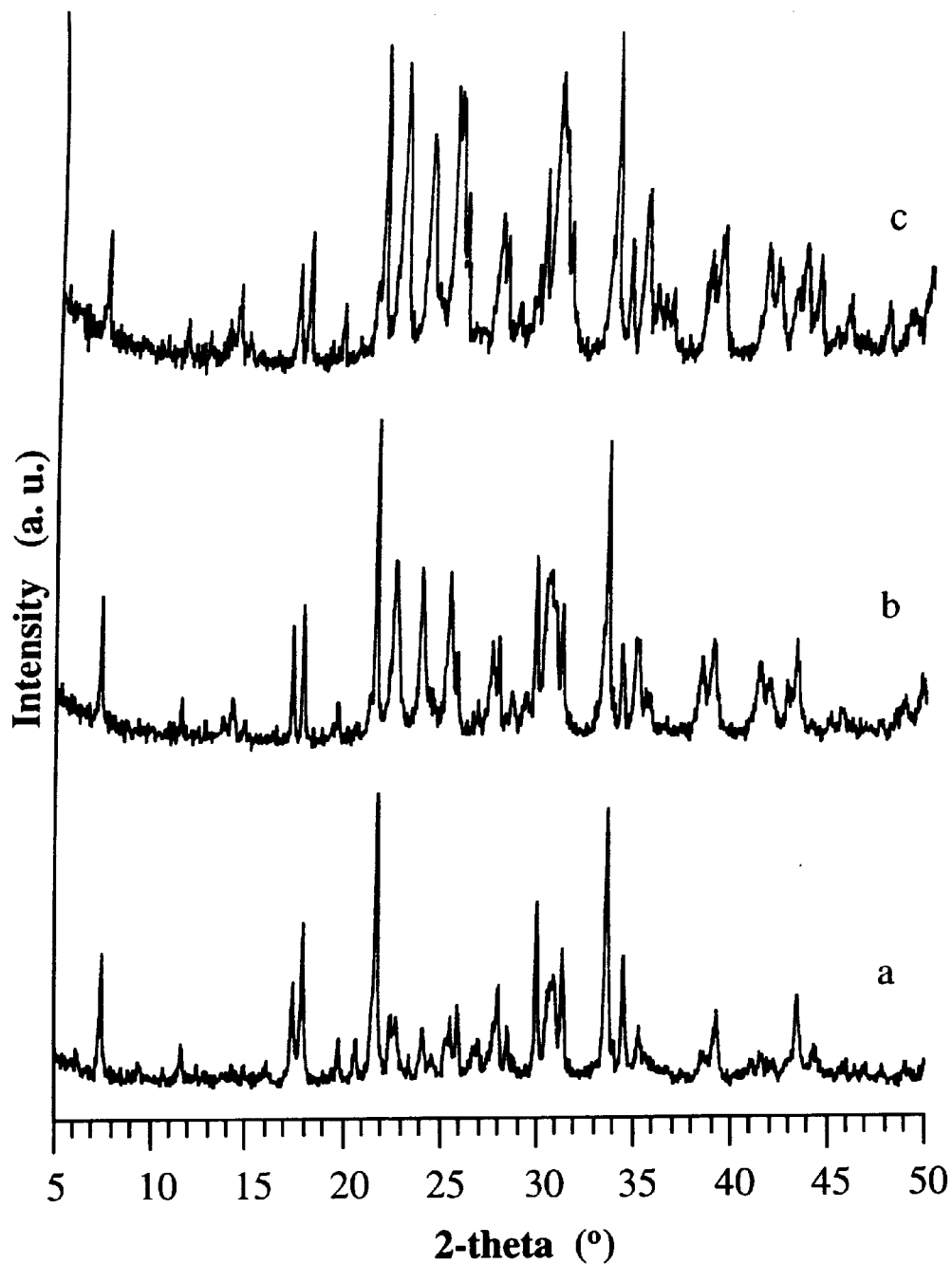
FIGS. 5*a*, 5*b* and 5*c* show XRD patterns of gmelinite, mixtures of gmelinite and layered phase, respectively.
Figure 6:
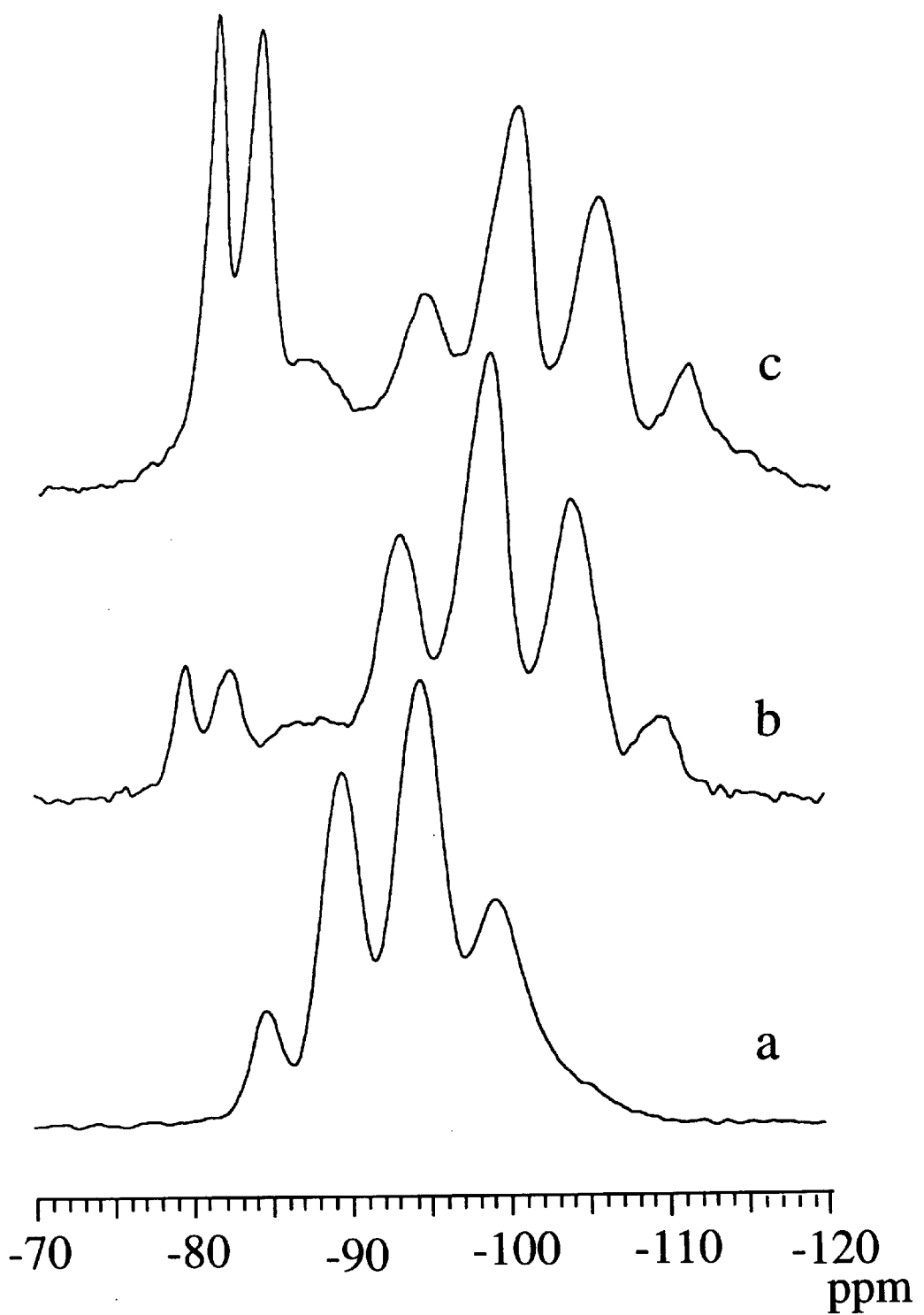
FIGS. 6*a*, 6*b* and 6*c* show $^{29}$Si NMR spectra of gmelinite, mixtures of gmelinite and layered phase, respectively.

Strontium-containing solutions of higher pH (>12.5) induced synthesis of layered phases ("layered" designation in Table 6). XRD patterns and NMR spectra of structures of gmelinite and layered phases are shown in FIGS. 5 and 6, respectively. Layered phases have also been obtained with solutions of higher strontium concentration (>1.0N) and a large amounts of the solution (>15 ml).

In summary, high pH, relatively high dominant alkaline earth cation concentration and a large amount of the solution produce chabazite with gmelinite while, low pH, relatively low dominant ion alkaline earth cation concentration and a small amount of the solution give the layered phase. Chabazite also occurred with short heating duration and low temperature, while the layered phase was synthesized at longer times and higher temperatures.

Adsorption onto gmelinite

Although GME structure has the main 12-membered ring channels interconnecting at right angles with a two-dimensional system of 8-membered ring channels, only 1.0% cyclohexane was adsorbed onto a natural gmelinite (Na, Ca form) and 7.3% cyclohexane was adsorbed even on a fault-free gmelinite (Daniels, et al., *J. Am. Chem. Soc.*, (1978), 3097). On the other hand, a natural gmelinite (Nova, Scotia) sorbed 0.0767 cc/g $N_2$ at −196° C. (Breck, *Zeolite Molecular Sieves* (1974) 625).

Gmelinite synthesized from Sr—Y zeolite according to the invention adsorbs 0.155 cc/g-zeolite $N_2$ at −196° C. and 0.120 cc/g $H_2O$, 0.137 cc/g $CH_3OH$ and 0.145 cc/g $C_2H_5OH$ at 25° C. (see Table 7). Propyl alcohols and hexanes are not adsorbed onto this zeolite.

TABLE 7

Adsorption onto synthetic gmelinite[a]

| Adsorbates | | Temperature at adsorption | Results cc/g-zeolite |
|---|---|---|---|
| Nitrogen | $N_2$ | −196° C. | 0.155 |
| Cyclohexane | $C_6H_{12}$ | 25° C. | N.A.[b] |
| n-hexane | $C_6H_{14}$ | 25° C. | N.A. |
| i-propyl alcohol | i $C_3H_7OH$ | 25° C. | N.A. |
| n-propyl alcohol | n $C_3H_7OH$ | 25° C. | N.A. |
| Ethanol | $C_2H_5OH$ | 25° C. | 0.145 |
| Methanol | $CH_3OH$ | 25° C. | 0.137 |
| Water | $H_2O$ | 25° C. | 0.120 |

[a]Samples were treated at 350° C. prior to adsorption.
[b]N.A. = no adsorption.

As can be seen from Table 7, gmelinite synthesized by hydrothermal conversion of Y-zeolite according to the invention shows higher capacity for the adsorption (at least of nitrogen) than natural gmelinite.

A number of alkaline earth zeolites have been synthesized through hydrothermal conversion of Y-zeolite with solutions containing alkaline earth cations according to methods of the present invention. Among these zeolites are synthetic analogues of the zeolites heulandite, brewsterite, harmotome and gmelinite. The Si/Al ratio of Y-zeolite has a significant influence on the final zeolites obtained. Barium was a suitable cation for the synthesis of harmotome, calcium was not effective for the conversion of Y-zeolite, and strontium showed the greatest variety of behaviors for the hydrothermal conversion of Y-zeolite to synthetic analogues of the natural zeolites. Gmelinite synthesized from Sr—Y zeolite had adsorption capacities that lie between these of natural (faulted) GME and a reported fault-free GME (Daniels, et al., *J. Am. Chem. Soc.*, (1978) 3097; Breck, *Zeolite Molecular Sieves* (1974) 625).

While the present invention is disclosed by reference to the preferred embodiments set forth above, it is to be understood that these are intended in an illustrative only. For example, based on the disclosures here relating to alkaline earth and alkali metal containing zeolites (and their preparation), modifications will readily occur to those skilled in the art. Such modifications which relate to these methods are new zeolites are considered to be within the spirit of the invention and within the scope of the appended claims.

We claim:

1. A method for synthesizing a zeolite, comprising the steps of:
   a) providing a Y zeolite having 2.0≦Si/Al≦3.5 and which includes an alkaline earth cation; and
   b) forming said zeolite under hydrothermal reaction conditions from a reaction mixture containing said Y-zeolite and aqueous solution of an alkaline earth cation.

2. A method according to claim 1, wherein said alkaline earth cation in said Y-zeolite and said alkaline earth cation in said reaction mixture are the same.

3. A method according to claim 1, wherein the content of other metal cations in said reaction mixture is less than 1%.

4. A method according to claim 1, wherein the reaction mixture further contains seeds of a zeolite.

5. A method according to claim 3, wherein said seeds are selected from the group consisting of heulandite and brewsterite zeolites.

6. A method according to claim 1, wherein said zeolite formed is selected from the group consisting of heulandite, gmelinite, harmotome, analcime, chabazite and brewsterite and mixtures thereof.

7. A method according to claim 1, wherein said alkaline earth cation is selected from the group consisting of $Ba^{2+}$, $Ca^{2+}$, and $Sr^{2+}$.

8. A method for synthesizing a zeolite, comprising the steps of:
   a) providing a Y zeolite having $2.0 \leq Si/Al \leq 3.5$; and
   b) forming said zeolite under hydrothermal reaction conditions from a reaction mixture containing said Y-zeolite and aqueous solution of an alkaline earth cation, the reaction mixture being substantially free of any zeolite directing agent.

9. A method for preparing synthetic heulandite, gmelinite, brewsterite, analcime or harmotome zeolite product, comprising the steps of:
   a) providing a reaction mixture containing Y-zeolite having $2.0 \leq Si/Al \leq 3.5$ and an alkaline earth cation, wherein the alkaline earth cation is in a concentration greater than that of the concentration of any other metal cation present in the reaction mixture; and
   b) converting under hydrothermal conditions said Y-zeolite in said reaction mixture to said zeolite product containing said alkaline earth cation.

10. A method according to claim 9, wherein said Y-zeolite includes an alkaline earth cation.

11. A method according to claim 10, wherein said alkaline earth cation in said Y-zeolite and said alkaline earth cation in said reaction mixture are the same.

12. A method according to claim 9, wherein the reaction mixture contains seeds of a zeolite.

13. A method according to claim 12, wherein said seeds are selected from the group consisting of heulandite and brewsterite zeolites.

14. A method according to claim 10, wherein said alkaline earth cation is selected from the group consisting of $Ba^{2+}$, $Ca^{2+}$ and $Sr^{2+}$.

15. A method according to claim 9 consisting of steps a) and b).

16. A method according to claim 9, wherein paid zeolite product is a mixture of any of gmelinite, brewsterite, analcime, and harmotome zeolites.

17. A method for preparing a zeolite having the phillipsite topology and the formula in terms of atomic ratios $BaO:Al_2O_3:6SiO_2:6H_2O$, comprising the steps of:
   a) providing a reaction mixture containing a first alkaline earth cation and a Y-zeolite, said Y-zeolite having $2.0 \leq Si/Al \leq 3.5$ and a second alkaline earth cation, the mixture being substantially free of any other alkaline earth cations and any zeolite structure directing agent; and
   b) forming said zeolite from said Y-zeolite under hydrothermal reaction conditions, said zeolite incorporating a first alkaline earth cation into its framework.

18. A method according to claim 17, wherein said first alkaline earth cation is $Ba^{2+}$.

19. A method according to claim 17, wherein said second alkaline earth cation is $Sr^{2+}$.

20. A method according to claim 17, wherein said reaction mixture further contains seeds of a zeolite selected from the group consisting of heulandite and brewsterite zeolites.

21. A method for preparing a zeolite having the brewsterite topology and the formula in terms of atomic ratios $SrO:Al_2O_3:5.8\ SiO_2:4.5\ H_2O$ comprising the steps of:
   a) providing a reaction mixture containing a first alkaline earth cation and a Y-zeolite, said Y-zeolite having $2.0 \leq Si/Al \leq 3.0$ and a second alkaline earth cation, the mixture being substantially free of any other alkaline earth cations and any zeolite structure directing agent; and
   b) forming said zeolite from said Y-zeolite under hydrothermal reaction conditions, said zeolite incorporating a first alkaline earth cation into its framework.

22. A method according to claim 21, wherein said first alkaline earth cation is $Sr^{2+}$.

23. A method according to claim 21, wherein said second alkaline earth cation is $Sr^{2+}$.

24. A method according to claim 21, wherein said reaction mixture further contains seeds of heulandite zeolite.

25. A method for preparing a zeolite having the heulandite topology comprising the steps of:
   a) providing a reaction mixture containing a first alkaline earth cation and a Y-zeolite, said Y-zeolite having $2.0 \leq Si/Al \leq 3.0$ and a second alkaline earth cation, the mixture being substantially free of any other alkaline earth cations and any zeolite structure directing agent; and
   b) forming said zeolite from said Y-zeolite under hydrothermal reaction conditions, said zeolite incorporating a first alkaline earth cation into its framework.

26. A method according to claim 25, wherein said first alkaline earth cation is $Sr^{2+}$.

27. A method according to claim 25, wherein said second alkaline earth cation is $Sr^{2+}$.

28. A method according to claim 25, wherein said reaction mixture further contains seeds of heulandite zeolite.

29. A method for preparing a zeolite having the gmelinite topology comprising the steps of:
   a) providing a reaction mixture containing a first alkaline earth cation and a Y-zeolite, said Y-zeolite having $2.0 \leq Si/Al \leq 2.4$ and a second alkaline earth cation, the mixture being substantially free of any other alkaline earth cations and any zeolite structure directing agent; and
   b) forming said zeolite from said Y-zeolite under hydrothermal reaction conditions, said zeolite incorporating a first alkaline earth cation into its framework.

30. A method according to claim 29, wherein said first alkaline earth cation is $Sr^{2+}$.

31. A method according to claim 30, wherein said second alkaline earth cation is $Sr^{2+}$.

* * * * *